(12) United States Patent
Jaradi et al.

(10) Patent No.: US 11,180,110 B2
(45) Date of Patent: Nov. 23, 2021

(54) VEHICLE BUCKLE ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 237 days.

(21) Appl. No.: 16/128,639

(22) Filed: Sep. 12, 2018

(65) Prior Publication Data

US 2020/0079317 A1 Mar. 12, 2020

(51) Int. Cl.
*B60R 22/195* (2006.01)
*B60R 22/20* (2006.01)
*B60R 22/26* (2006.01)
*B60R 22/18* (2006.01)

(52) U.S. Cl.
CPC .......... *B60R 22/1958* (2013.01); *B60R 22/26* (2013.01); *B60R 2022/1806* (2013.01); *B60R 2022/1957* (2013.01); *B60R 2022/207* (2013.01)

(58) Field of Classification Search
CPC ................ B60R 22/1958; B60R 22/26; B60R 2022/1957; B60R 2022/1806; B60R 22/205; B60R 2022/207; B60R 2022/208; B60R 22/20; B60R 22/201; B60R 22/202; B60R 22/321
See application file for complete search history.

(56) References Cited

U.S. PATENT DOCUMENTS

| 3,186,760 | A | * | 6/1965 | Lohr | B60R 22/26 297/216.18 |
| 3,215,220 | A | * | 11/1965 | Schoeffler | B60R 22/321 180/270 |
| 3,833,239 | A | * | 9/1974 | Coenen | B60R 22/06 280/804 |
| 3,901,531 | A | * | 8/1975 | Prochazka | B60R 22/1955 297/470 |
| 4,200,308 | A | * | 4/1980 | Irwin | B60R 22/06 180/282 |
| 4,203,618 | A | * | 5/1980 | Frank | B60R 22/06 280/804 |
| 4,221,403 | A | * | 9/1980 | Grosser | B60R 22/1958 280/806 |
| 4,248,480 | A | * | 2/1981 | Koucky | B60N 2/0825 248/393 |
| 4,258,933 | A | * | 3/1981 | Takada | B60R 22/04 280/804 |

(Continued)

FOREIGN PATENT DOCUMENTS

JP 3608769 B2 1/2005
JP 201580950 A 4/2015

(Continued)

*Primary Examiner* — Drew J Brown
*Assistant Examiner* — Timothy Wilhelm
(74) *Attorney, Agent, or Firm* — Frank A. MacKenzie; Bejin Bieneman PLC

(57) ABSTRACT

An assembly includes a rod, a tube slidably supported by the rod, a seatbelt buckle supported by the tube, and a lock. The tube and the rod are releasably engageable to each other by the lock.

19 Claims, 7 Drawing Sheets

(56) References Cited

U.S. PATENT DOCUMENTS

| | | | | | |
|---|---|---|---|---|---|
| 4,435,000 | A | * | 3/1984 | Chiba | B60R 22/1958 280/806 |
| 4,482,188 | A | * | 11/1984 | Tilly | B60R 22/26 248/393 |
| 4,577,730 | A | * | 3/1986 | Porter | F16B 7/1481 188/67 |
| 4,589,680 | A | * | 5/1986 | Gurtler | B60R 22/03 180/268 |
| 4,840,398 | A | * | 6/1989 | Matthias | B60R 21/13 280/756 |
| 4,900,060 | A | * | 2/1990 | Yamamoto | B60R 22/06 280/804 |
| 4,913,497 | A | * | 4/1990 | Knabel | B60R 22/1958 297/480 |
| 4,938,319 | A | * | 7/1990 | Ernst | B60N 2/43 188/67 |
| 4,955,467 | A | * | 9/1990 | Kallenbach | F16F 7/09 188/134 |
| 5,123,673 | A | * | 6/1992 | Tame | B60R 22/03 100/268 |
| 5,234,181 | A | * | 8/1993 | Schroth | B60R 22/1953 244/122 B |
| 5,294,184 | A | * | 3/1994 | Blake | B60R 22/26 280/801.1 |
| 5,377,554 | A | * | 1/1995 | Reulein | B60R 21/00 74/2 |
| 5,431,448 | A | * | 7/1995 | Ball | B60R 22/20 280/801.1 |
| 5,564,307 | A | * | 10/1996 | Uryu | B60R 22/1953 280/806 |
| 5,568,843 | A | * | 10/1996 | Porter | B60N 2/23 188/67 |
| 5,575,449 | A | * | 11/1996 | Shinbori | B60N 2/0705 248/429 |
| 5,743,597 | A | * | 4/1998 | Jessup | B60R 22/26 280/801.2 |
| 5,819,881 | A | * | 10/1998 | Stringer | B60N 2/23 188/67 |
| 5,924,772 | A | * | 7/1999 | Pleyer | B60R 22/20 280/804 |
| 6,092,875 | A | * | 7/2000 | Pleyer | B60R 22/18 280/801.1 |
| 6,145,881 | A | * | 11/2000 | Miller, III | B60R 22/1951 280/801.2 |
| 6,250,680 | B1 | * | 6/2001 | Moker | B60R 22/20 280/801.2 |
| 6,279,954 | B1 | * | 8/2001 | Townsend | B60R 22/03 280/801.1 |
| 6,308,986 | B1 | * | 10/2001 | Townsend | B60R 22/03 280/804 |
| 6,336,664 | B1 | * | 1/2002 | Roder | B60R 22/1958 280/806 |
| 6,352,285 | B1 | * | 3/2002 | Schulte | B60N 2/809 280/756 |
| 6,527,298 | B2 | * | 3/2003 | Kopetzky | B60R 22/1958 280/806 |
| 6,550,867 | B2 | * | 4/2003 | Rogers, Jr. | B60R 22/03 280/808 |
| 6,643,974 | B2 | * | 11/2003 | Ruiz | A01K 97/10 248/517 |
| 6,679,185 | B2 | * | 1/2004 | Sullivan | B61B 10/046 104/172.1 |
| 6,698,795 | B2 | * | 3/2004 | Enomoto | B60J 5/0479 280/808 |
| 6,769,716 | B2 | * | 8/2004 | Rouhana | B60R 22/02 280/801.1 |
| 6,843,504 | B2 | * | 1/2005 | Motozawa | B60R 22/1955 280/801.1 |
| 6,883,834 | B2 | * | 4/2005 | Grabowski | B60R 22/03 280/801.2 |
| 6,902,188 | B2 | * | 6/2005 | Nakamura | B60R 21/213 267/174 |
| 6,902,195 | B2 | * | 6/2005 | Ball | B60R 22/1955 280/806 |
| 7,070,153 | B1 | * | 7/2006 | Stenard | B60N 2/4242 248/157 |
| 7,118,133 | B2 | * | 10/2006 | Bell | B60R 22/022 280/806 |
| 7,137,650 | B2 | * | 11/2006 | Bell | B60R 22/022 280/806 |
| 7,188,868 | B2 | * | 3/2007 | Yamaguchi | B60R 22/195 280/806 |
| 7,219,929 | B2 | * | 5/2007 | Bell | B60R 22/022 280/806 |
| 7,407,193 | B2 | * | 8/2008 | Yamaguchi | B60R 22/03 280/801.1 |
| 7,416,218 | B2 | * | 8/2008 | Fujii | B60R 22/022 280/801.1 |
| 7,458,609 | B2 | * | 12/2008 | Gyllenspetz | B60R 22/03 280/801.1 |
| 7,475,909 | B2 | * | 1/2009 | Takao | B60R 22/022 280/801.2 |
| 7,584,997 | B2 | * | 9/2009 | Bachmann | B60R 22/1953 180/268 |
| 7,686,338 | B2 | * | 3/2010 | Dallwig | B60R 22/03 280/801.1 |
| 7,850,204 | B2 | * | 12/2010 | Freisleben | B60R 22/03 280/801.1 |
| 7,850,205 | B2 | * | 12/2010 | Pisaniello | B60R 22/1958 280/801.1 |
| 7,866,703 | B2 | * | 1/2011 | Spahn | B60R 22/195 280/806 |
| 7,967,339 | B2 | * | 6/2011 | Usoro | B60R 22/03 280/801.2 |
| 8,157,292 | B2 | * | 4/2012 | You | B60R 22/03 280/804 |
| 8,496,269 | B2 | * | 7/2013 | Holbein | B60R 22/03 280/806 |
| 8,500,166 | B2 | * | 8/2013 | Inuzuka | B60R 21/2338 280/743.2 |
| 8,550,499 | B2 | * | 10/2013 | Russell | B60R 22/022 280/806 |
| 9,216,714 | B2 | * | 12/2015 | Seyffert | B60R 22/03 |
| 10,081,330 | B2 | * | 9/2018 | Arnold | B60R 22/201 |
| 10,246,046 | B2 | * | 4/2019 | Sharif | B60R 22/28 |
| 2002/0043796 | A1 | * | 4/2002 | Webber | B60R 22/1952 280/806 |
| 2003/0010560 | A1 | * | 1/2003 | Motozawa | B60R 22/1951 180/268 |
| 2003/0075393 | A1 | * | 4/2003 | Shields | B60N 2/929 188/67 |
| 2003/0075394 | A1 | * | 4/2003 | Shields | B60N 2/929 188/67 |
| 2006/0181073 | A1 | * | 8/2006 | Sugiyama | B60R 22/03 280/801.1 |
| 2009/0139069 | A1 | * | 6/2009 | Thomas | B60R 22/321 24/603 |
| 2011/0057432 | A1 | * | 3/2011 | You | B60N 2/688 280/804 |
| 2013/0009391 | A1 | * | 1/2013 | Miller | B60R 21/18 280/806 |
| 2015/0217720 | A1 | * | 8/2015 | Palaniappan | B60R 22/26 280/804 |
| 2019/0135226 | A1 | * | 5/2019 | Maekawa | B60R 22/48 |
| 2019/0176749 | A1 | * | 6/2019 | Jaradi | B60R 22/206 |
| 2019/0225185 | A1 | * | 7/2019 | Ohno | B60N 2/0705 |

FOREIGN PATENT DOCUMENTS

| | | |
|---|---|---|
| JP | 2016193657 A | 11/2016 |
| KR | 100435330 B1 | 6/2004 |
| WO | 2004041602 A1 | 5/2004 |

* cited by examiner

VEHICLE BUCKLE ASSEMBLY

BACKGROUND

An interior of a vehicle, such as an automobile, typically includes various devices for absorbing energy from an occupant of the vehicle during an impact of the vehicle. One such device may be a seatbelt. The vehicle includes a seatbelt for each of the seats onboard. The seatbelt includes webbing that, when the seatbelt is buckled, passes across an occupant of the seat. The seatbelt is typically a three-point harness, meaning that the webbing is attached at three points around the occupant when fastened: an anchor, a retractor, and a buckle.

Automobiles are subject to a variety of crash tests, including standard tests regulated by the National Highway Traffic Safety Administration (NHTSA). For example, these tests may be directed toward oblique impacts, i.e., impacts that occur at an angle of 10-50 degrees relative to a vehicle's trajectory. During the oblique impact test, a test dummy may move forward and laterally, and a seatbelt may impart a load onto a chest of the dummy.

DETAILED DESCRIPTION

Figure 1:
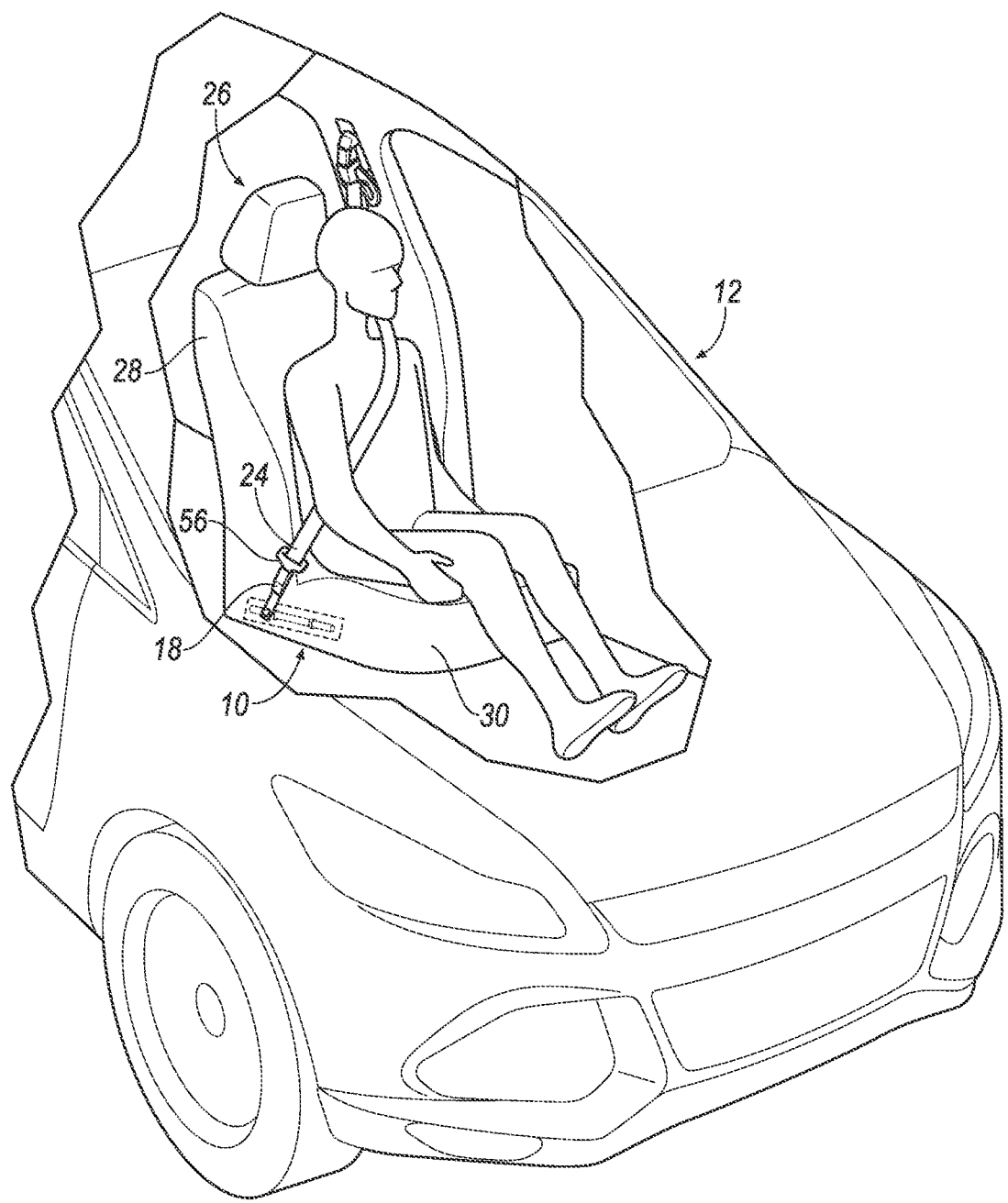
FIG. 1 is a perspective view of a vehicle.

An assembly includes a seat bottom, a rod supported by the seat bottom, a tube slidably supported by the rod, a seatbelt buckle supported by the tube, and a lock supported by the seat bottom and releasably engaging the tube to the rod.

The assembly may further include a computer programmed to actuate the lock to disengage the tube from the rod upon detecting a vehicle impact.

The seatbelt buckle may be rotatable relative to the tube.

The tube and the rod may each define a hole and the lock may include a pin that extends through the holes in the tube and the rod.

The assembly may further include a spring between the seat bottom and the tube and biasing the tube. The spring may extend circumferentially around the rod. The assembly may further include a stopper fixed relative to the rod, the tube being between the spring and the stopper.

The assembly may further include a platform supported by the seat bottom and the rod and the lock may both be supported by the platform.

The rod may be cylindrical and the tube may be annular about the rod.

The lock may be a solenoid lock.

An assembly includes a rod, a tube slidably supported by the rod, a seatbelt buckle supported by the tube, and a lock, the tube and the rod being releasably engageable to each other by the lock.

The assembly may further include a platform and the rod and lock may be fixed to the platform.

The seatbelt buckle may be rotatable relative to the tube.

The tube and the rod may each define a hole and the lock may include a pin that extends through the holes in the tube and the rod.

The assembly may further include a spring having an end fixed relative to the rod and biasing the tube. The spring may extend circumferentially around the rod. The assembly may further include a stopper fixed relative to the rod, the tube being between the spring and the stopper.

The rod may be cylindrical and the tube may be annular about the rod.

The lock may be a solenoid lock.

With reference to the Figures, wherein like numerals indicate like parts throughout the several views, a buckle assembly 10, 10' of a vehicle 12 includes a rod 14, 14', a tube 16 slidably supported by the rod 14, 14', a seatbelt buckle 18 supported by the tube 16, and a lock 20. The tube 16 and the rod 14, 14' are releasably engageable to each other by the lock 20.

During a vehicle impact, the lock 20 releases the tube 16 from the rod 14, 14', allowing the tube 16 to slide along the rod 14, 14'. Because the seatbelt buckle 18 is supported by the tube 16, the seatbelt buckle 18 pulls the tube 16 forward along the rod 14, 14'. Specifically, momentum of a test dummy may pull on webbing 22 connected to the seatbelt buckle 18, pulling the seatbelt buckle 18 forward. For example, a retractor and/or a pretensioner may lock the webbing 22 during the vehicle impact. The routing of the webbing 22 and friction with a D-ring may increase load liming in the retractor by 0.5-1.0 kilonewtons, which may increase compression forces on a chest and/or upper torso of the test dummy. The forward motion of the seatbelt buckle 18 allowed by the tube 16 pulls the webbing 22 forward and may reduce compression forces on a chest and/or upper torso of the test dummy. As one example described below, the lock 20 may include a pin 24 that engages the tube 16 to the rod 14, 14', and the pin 24 may be retractable from the tube 16 and the rod 14, 14' upon detection of the vehicle impact by an on-board restraint and/or body control module in communication with impact sensors. When the lock 20 receives a signal indicating the vehicle impact, the lock 20 may retract the pin 24, releasing the tube 16 from the rod 14, 14' and allowing the tube 16 and the seatbelt buckle 18 to slide along the rod 14, 14'.

The vehicle 12 includes a seat 26, as shown in FIGS. 1-3, 8. The seat 26 includes a seat back 28 and the seat bottom 30. The seat back 28 may be supported by the seat bottom 30 and may be stationary or movable relative to the seat bottom 30. The seat back 28 and/or the seat bottom 30 may be adjustable in multiple degrees of freedom. Specifically, the seat back 28 and/or the seat bottom 30 may themselves be adjustable, in other words, with adjustable components within the seat back 28 and/or the seat bottom 30, and/or may be adjustable relative to each other.

Figure 2:
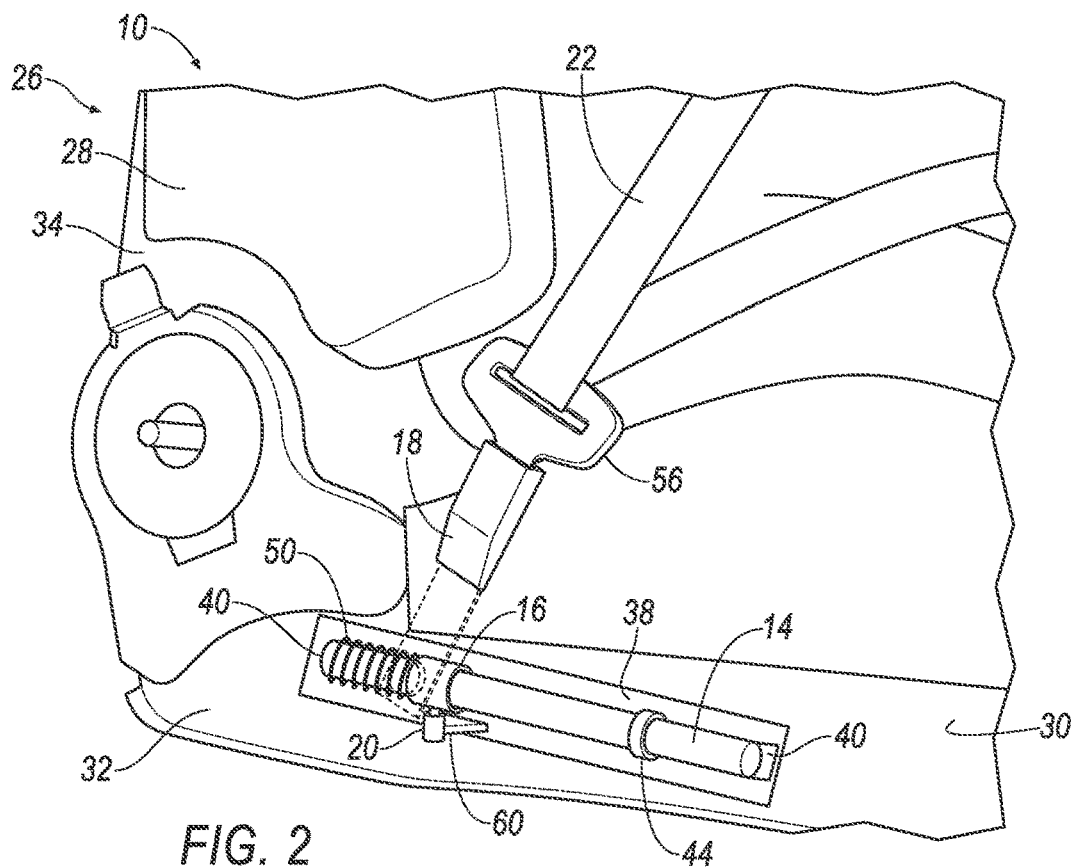
FIG. 2 is a perspective view of a buckle assembly.
Figure 3:
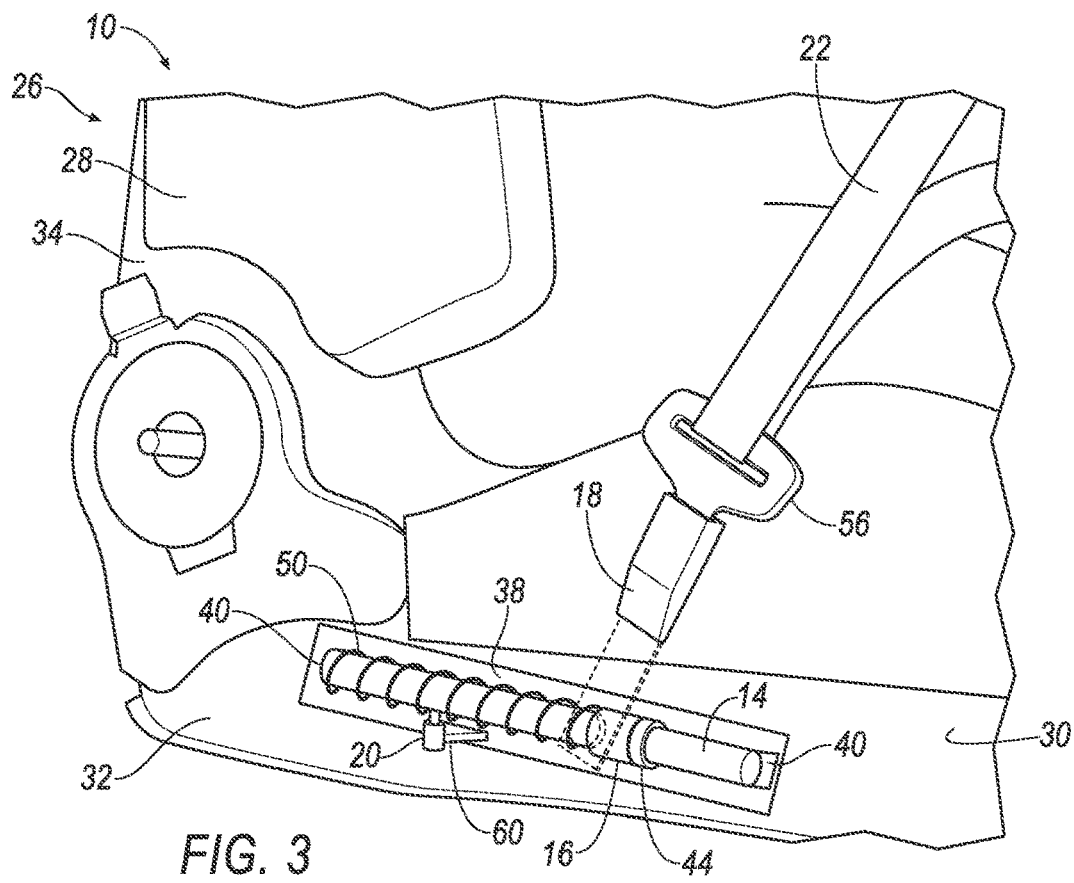
FIG. 3 is a perspective view of the buckle assembly during an impact.
Figure 8:
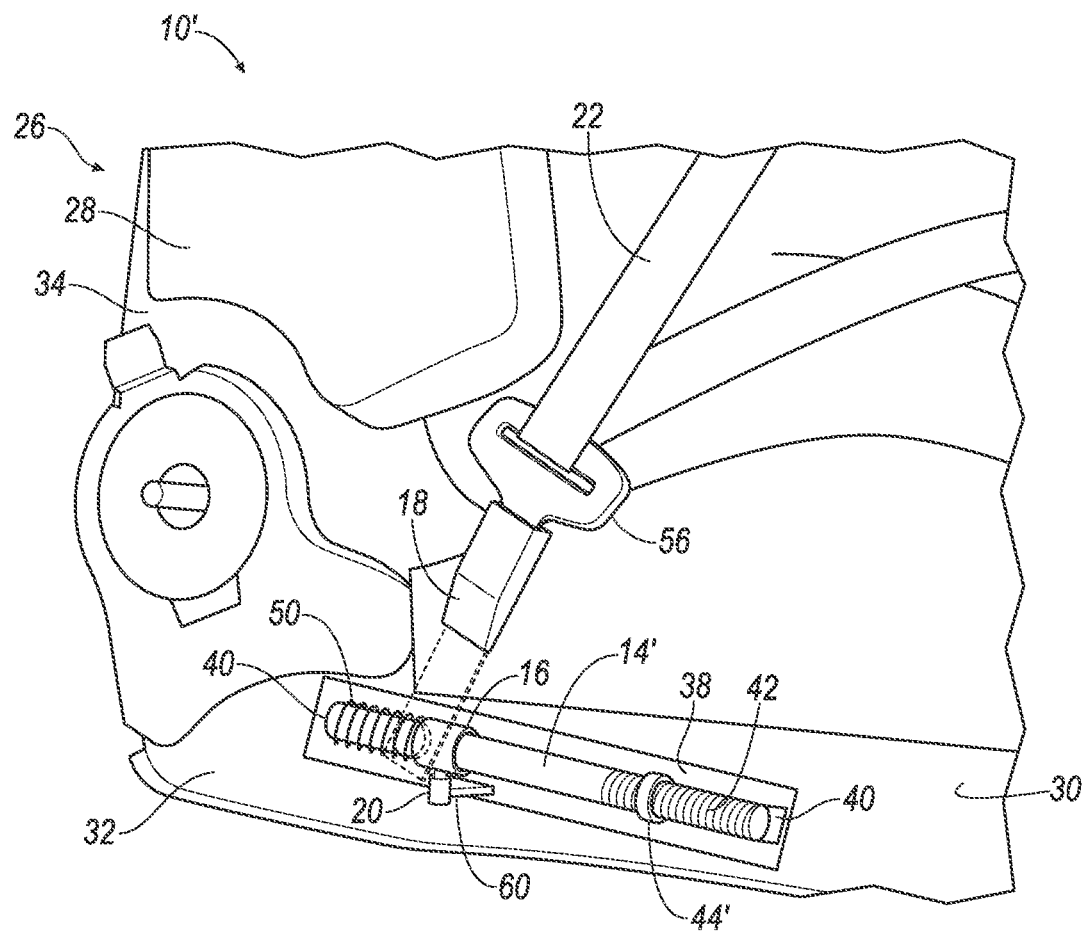
FIG. 8 is a perspective view of a second embodiment of the buckle assembly.

As shown in FIGS. 2-3 and 8, The seat bottom 30 may include a frame 32. As shown in FIGS. 2-3 and 8, the seat back 28 may include a frame 34. The seat 26 may include a covering 36 supported on the frame 32, 34. The frame 32, 34 may include tubes, beams, etc. The frame 32, 34 may be formed of any suitable plastic material, e.g., carbon fiber reinforced plastic (CFRP), glass fiber-reinforced semi-finished thermoplastic composite (organosheet), etc. As another example, some or all components of the frame 32, 34 may be formed of a suitable metal, e.g., steel, aluminum, etc.

The covering 36 may include upholstery and padding. The upholstery may be formed of cloth, leather, faux leather, or any other suitable material. The upholstery may be stitched in panels around the frame 32, 34. The padding may be between the covering 36 and the frame 32, 34 and may be foam or any other suitable material.

The buckle assembly 10, 10' may include a platform 38, as shown in FIGS. 2-3, 5, and 8. The platform 38 is supported by the seat bottom 30. For example, the platform 38 may be supported by the frame 32 of the seat bottom 30. The platform 38 may be fixed to the seat bottom 30 with, e.g., fasteners, welds, etc. The platform 38 may be elongated along the seat bottom 30. The rod 14, 14' and the lock 20 may both be supported by the platform 38. For example, the rod 14, 14' and the lock 20 may both be fixed to the platform 38, i.e., having a direct connection to the platform 38. The platform 38 may be metal, e.g., steel, aluminum, etc.

The buckle assembly 10, 10' includes the rod 14, 14', as shown in FIGS. 2-3, 5-8. The rod 14, 14' is supported by the seat bottom 30. For example, the rod 14, 14' may be fixed to the platform 38, and the platform 38 may be supported by the seat bottom 30. The rod 14, 14' may be fixed to the platform 38 with brackets 40, as shown in FIGS. 2-3, 5, and 8. The brackets 40 space the rod 14, 14' from the platform 38, allowing the tube 16 to slide along the rod 14, 14' without contacting the platform 38. The rod 14, 14' extends along the platform 38. Alternatively, not shown in the Figures, the rod 14, 14' may be fixed directly to the seat bottom 30, e.g., to the frame 32 of the seat bottom 30. The rod 14 may be smooth. Alternatively, the rod 14' may have threads 42 along a portion of the rod 14'. The rod 14, 14' may be cylindrical. The rod 14, 14' may define a hole 46. The rod 14, 14' may be sized to allow movement of the tube 16 along the rod 14, 14' to allow forward movement of the seatbelt buckle 18 during the vehicle impact.

The buckle assembly 10, 10' includes the tube 16, as shown in FIGS. 2-8. The tube 16 is slidably supported by the rod 14, 14'. That is, the tube 16 may slide along the rod 14, 14'. FIG. 2 shows the tube 16 prior to a vehicle impact secured to the rod 14, 14'. During the vehicle impact, the momentum of the tube 16 may slide the tube 16 along the rod 14, 14'. FIG. 3 shows the tube 16 during the vehicle impact having slid along the rod 14, 14'. The tube 16 may be annular about the rod 14, 14', i.e., the tube 16 may be disposed circumferentially about the rod 14, 14'. The tube 16 may define a hole 48. The hole 48 of the tube 16 may be concentric with the hole 46 of the rod 14, 14'.

The buckle assembly 10, 10' may include a spring 50, as shown in FIGS. 2-3, 5-8. The spring 50 may be disposed between the seat bottom 30 and the tube 16. The spring 50 has a first end 52 fixed relative to the rod 14, 14' and a second end 54 fixed to the tube 16. For example, the first end 52 may be fixed to the rod 14, 14', the platform 38, etc. The spring 50 biases the tube 16, e.g., to the left in FIG. 2. The spring 50 pushes the tube 16 along the rod 14, 14' when the tube 16 is released from the rod 14, 14'. The spring 50 may extend circumferentially around the rod 14, 14'. That is, the spring 50 may extend around a circumference of the rod 14, 14'. During the vehicle impact, as shown in FIG. 3, the tension in the spring 50 uncoils the spring 50, pushing against the tube 16 to slide the tube 16 along the rod 14, 14'.

The buckle assembly 10, 10' may include a stopper 44, 44', as shown in FIGS. 2-3, 5, and 8. The stopper 44, 44' may be fixed relative to the rod 14, 14'. The stopper 44, 44' may be annular about the rod 14, 14'. The tube 16 may be between the spring 50 and the stopper 44, 44'. The stopper 44, 44' prevents movement of the tube 16 along the rod 14, 14'. Thus, the position of the stopper 44, 44' determines the sliding distance of the tube 16 along the rod 14, 14'. During the vehicle impact, the tube 16 slides along the rod 14, 14' until contacting the stopper 44, 44' which prevents further movement of the tube 16 along the rod 14, 14'. The stopper 44, 44' may be annular. The stopper 44 may be press fit to the rod 14. Alternatively, the stopper 44' may be threaded onto the threads 42 of the rod 14'.

Figure 4:
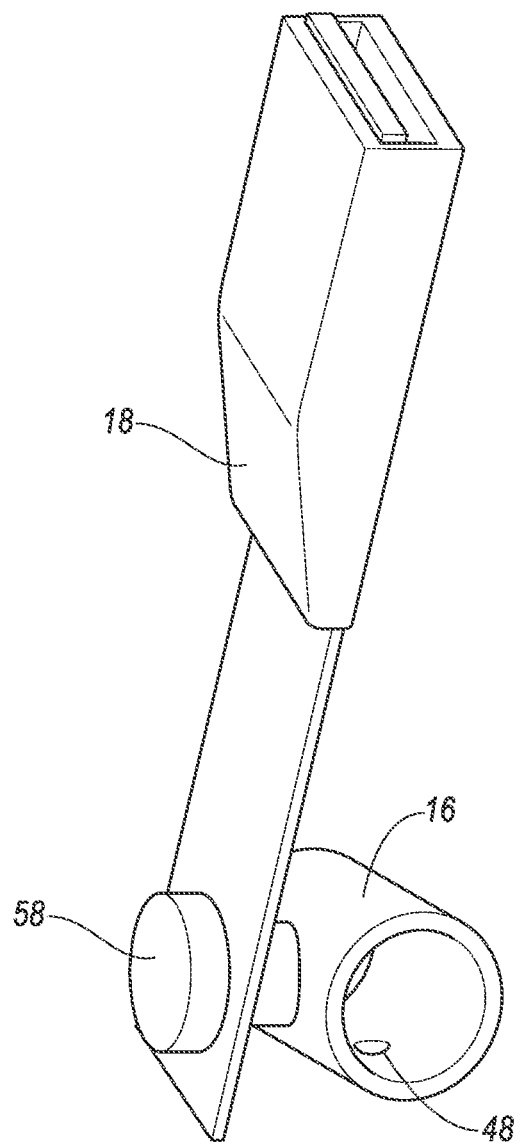
FIG. 4 is a view of a seatbelt buckle supported by a tube.

The buckle assembly 10, 10' includes the seatbelt buckle 18, as shown in FIGS. 1-4 and 8. The seatbelt buckle 18 is supported by the tube 16. The seatbelt buckle 18 receives a tongue 56, as shown in FIGS. 1-3 and 8. The tongue 56 receives the webbing 22. The seatbelt buckle 18 secures the tongue 56 and the webbing 22 to the seat 26, directing the webbing 22 across the test dummy, e.g., as one point in a three-point harness. During the vehicle impact, momentum from the webbing 22 pulls the tongue 56, pulling the seatbelt buckle 18 along the rod 14, 14'. The seatbelt buckle 18 moves along the rod 14, 14', which may reduce compression forces on the chest and/or upper torso of the test dummy. The seatbelt buckle 18 may be rotatable relative to the tube 16. That is, as shown in FIG. 4, the seatbelt buckle 18 may be supported by the tube 16 with a fastener 58 that allows the seatbelt buckle 18 to rotate relative to the tube 16. For example, the fastener 58 may be a smooth bolt fixed to the tube 16 and rotatably supporting the seatbelt buckle 18. The webbing 22 may rotate the seatbelt buckle 18 while pulling the seatbelt buckle 18 along the rod 14, 14'.

Figure 5:
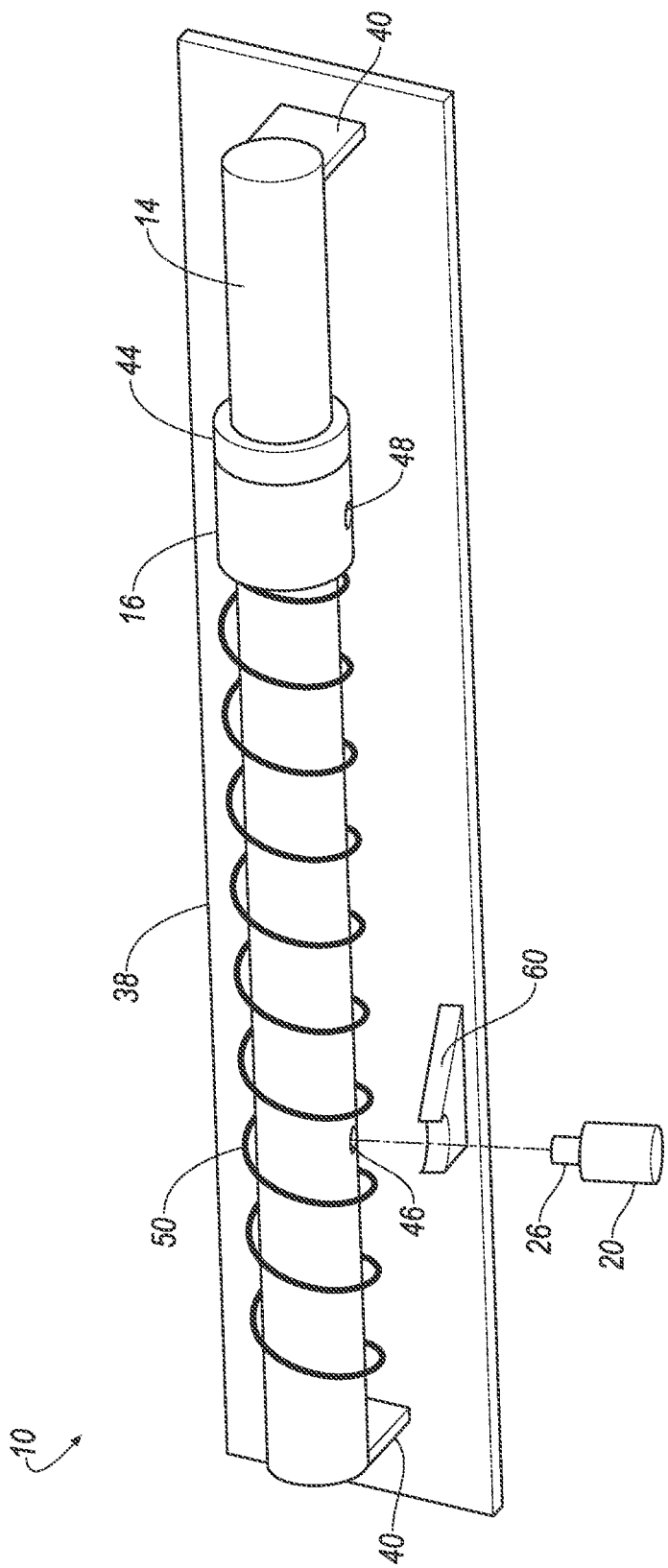
FIG. 5 is a magnified view of a lock, the tube, and a rod of the buckle assembly.

The buckle assembly 10, 10' includes the lock 20, as shown in FIGS. 2-3 and 5-9. The lock 20 releasably engages the tube 16 to the rod 14, 14'. The tube 16 and the rod 14, 14' are releasably engageable to each other by the lock 20. FIG. 2 shows the lock 20 engaging the tube 16 to the rod 14. FIG. 3 shows the lock 20 having released the tube 16 from the rod 14. FIG. 5 shows the lock 20 exploded from the rod 14 and aligned with the hole 46 of the rod 14. The lock 20 is supported by the seat bottom 30. The lock 20 may be supported by the platform 38. For example, the lock 20 may be fixed to the platform 38 with brackets 60. The lock 20 may be a solenoid lock. That is, the lock 20 may be an electromagnetic device that, upon actuation, generates a magnetic field that may move the pin 24. During the vehicle impact, the lock 20 disengages the tube 16 from the rod 14, 14', allowing the tube 16 to slide along the rod 14, 14'.

Figure 6:
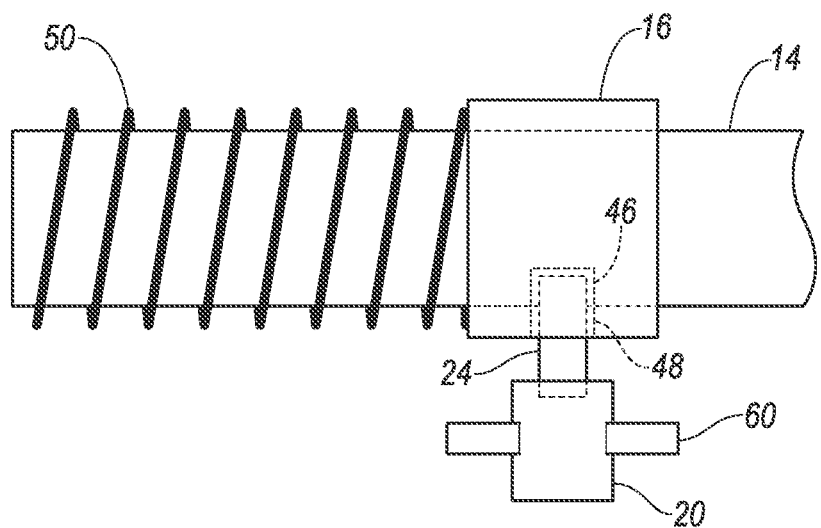
FIG. 6 is a side view of the lock engaging the tube to the rod.
Figure 7:
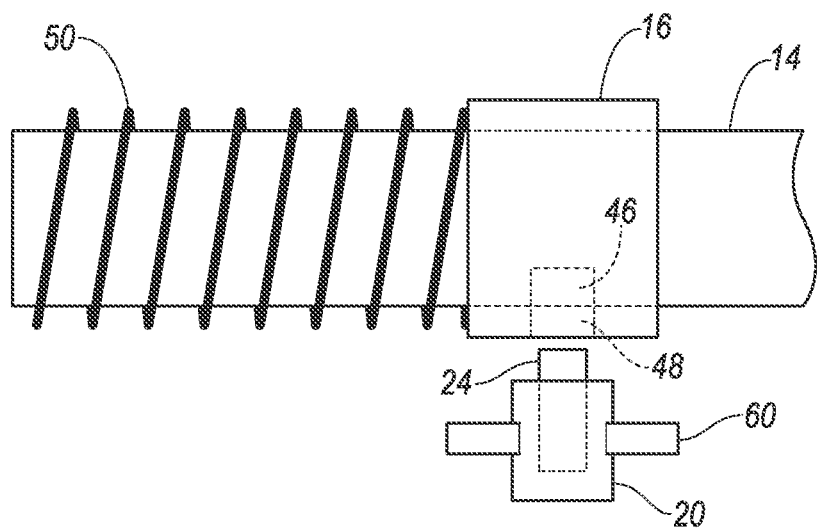
FIG. 7 is a side view of the lock disengaged from the tube and the rod.

The lock 20 may include the pin 24, as shown in FIGS. 5-7. The pin 24 may extend through the hole 48 of the tube 16 and the hole 46 of the rod 14, 14', as shown in FIG. 6, to engage the tube 16 with the rod 14, 14'. The hole 46 of the rod 14, 14' may be concentric with the hole 48 of the tube 16 to receive the pin 24. The pin 24 prevents movement of the tube 16 along the rod 14, 14' when the pin 24 extends through the hole 48 of the tube 16 and the hole 46 of the rod 14, 14'. That is, the tube 16 may contact the pin 24 when the pin 24 extends through the holes 46, 48.

During the vehicle impact, the lock 20 retracts the pin 24 from the hole 48 of the tube 16 and the hole 46 of the rod 14, 14', as shown in FIG. 7. The spring 50 and/or the buckle 18 urge the tube 16, which may slide along the rod 14, 14' without interference from the pin 24. Retracting the pin 24 from the holes 46, 48 thus allows the tube 16 to slide along the rod 14, 14' during the vehicle impact, allowing the buckle 18 to slide.

Figure 9:
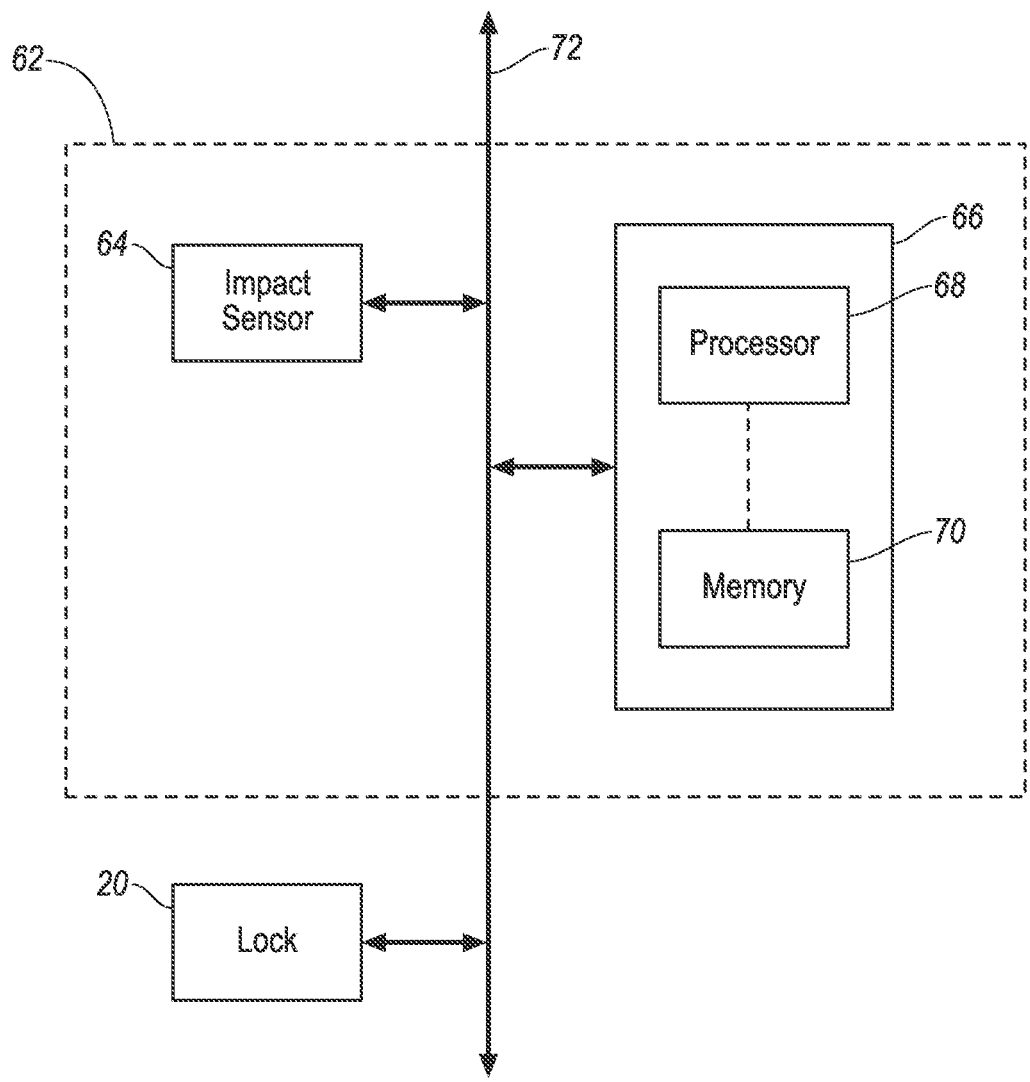
FIG. 9 is a block diagram of an impact sensing subsystem.

As shown in FIG. 9, the vehicle 12 may include an impact sensing subsystem 62. The impact sensing subsystem includes an impact sensor 64 and a computer 66. The computer 66 includes a processor 68 and a memory 70. The memory 70 stores instructions executable by the processor 68. The impact sensing subsystem 62 communicates with the lock 20. The computer 66 may be programmed to actuate the lock 20 to disengage the tube 16 from the rod 14, 14' upon detecting a vehicle impact.

The impact sensing subsystem 62 detects the vehicle impact. The impact sensor 64 may detect different impacts, e.g., a front impact, an oblique impact, a side impact, etc. The impact sensor 64 may be programmed to detect an oblique impact, i.e., an impact that occurs at an angle of 10-50 degrees relative to the vehicle's trajectory. The impact sensor 64 may be of any suitable type, e.g., post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The vehicle 12 may include a plurality of impact sensors 64 located at numerous points in or on the vehicle 12. During an oblique impact, the test dummy may move forward and laterally, and the webbing 22 may impart a load onto the chest and/or the upper torso of the test dummy.

To facilitate communications, the computer 66, the impact sensor 64, the lock 20, and other components in the vehicle 12 may be connected to a communication bus 72, such as a controller area network (CAN) bus, of the vehicle 12. The computer 66 may use information from the communication bus 72 to control the triggering of the lock 20. The lock 20 may be connected to the computer 66 or may be connected to the communication bus 72.

The computer 66 may be programmed to actuate the lock 20 upon detecting an oblique impact. The computer 66 may receive data from the impact sensor 64 indicating a vehicle impact, e.g., an oblique impact. Upon receiving the data from the impact sensor 64, the computer 66 may instruct the lock 20 to retract the pin 24 from the holes 46, 48. The lock 20 may receive the instruction from the computer 66 and may retract the pin 24 from the holes 46, 48, allowing the tube 16 to slide along the rod 14, 14' and movement of the seatbelt buckle 18.

During a vehicle impact, momentum of a test dummy pulls on the webbing 22, pulling against the seatbelt buckle 18. Upon detecting the vehicle impact, the computer 66 actuates the lock 20, releasing the pin 24 from the hole 46 of the rod 14, 14' and the hole 48 of the tube 16. The webbing 22 pulls the seatbelt buckle 18, which pulls the tube 16. The tube 16 then slides along the rod 14, 14' until reaching the stopper 44, 44'. The forward movement of the buckle 18 may reduce compression forces on the chest and/or upper torso of the test dummy.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a seat bottom;
   a rod supported by the seat bottom;
   a tube slidably supported by the rod;
   a seatbelt buckle supported by the tube;
   a lock supported by the seat bottom and engaging the tube to the rod, the lock being actuatable to disengage the tube from the rod; and
   a computer programmed to actuate the lock to disengage the tube from the rod upon detecting a vehicle impact.

2. The assembly of claim 1, wherein the seatbelt buckle is rotatable relative to the tube.

3. The assembly of claim 1, wherein the tube and the rod each define a hole and the lock includes a pin that extends through the holes in the tube and the rod.

4. The assembly of claim 1, further comprising a spring between the seat bottom and the tube and biasing the tube.

5. The assembly of claim 4, wherein the spring extends circumferentially around the rod.

6. The assembly of claim 4, further comprising a stopper fixed relative to the rod, the tube being between the spring and the stopper.

7. The assembly of claim 6, wherein the rod includes a smooth portion and a threaded portion, the tube is supported by the smooth portion, and the stopper is threaded onto the threaded portion.

8. The assembly of claim 1, further comprising a platform supported by the seat bottom and the rod and the lock are both supported by the platform.

9. The assembly of claim 1, wherein the rod is cylindrical and the tube is annular about the rod.

10. The assembly of claim 1, wherein the lock is a solenoid lock.

11. An assembly, comprising:
    a rod;
    a tube slidably supported by the rod;
    a seatbelt buckle supported by the tube;
    a lock engaging the tube to the rod, the lock being actuatable to disengage the tube from the rod; and
    a computer programmed to actuate the lock to disengage the tube from the rod upon detecting a vehicle impact.

12. The assembly of claim 11, further comprising a platform and the rod and lock are fixed to the platform.

13. The assembly of claim 11, wherein the seatbelt buckle is rotatable relative to the tube.

14. The assembly of claim 11, wherein the tube and the rod each define a hole and the lock includes a pin that extends through the holes in the tube and the rod.

15. The assembly of claim 11, further comprising a spring having an end fixed relative to the rod and biasing the tube.

16. The assembly of claim 15, wherein the spring extends circumferentially around the rod.

17. The assembly of claim 15, further comprising a stopper fixed relative to the rod, the tube being between the spring and the stopper.

18. The assembly of claim 11, wherein the rod is cylindrical and the tube is annular about the rod.

19. The assembly of claim 11, wherein the lock is a solenoid lock.

* * * * *